United States Patent [19]
Smith

[11] 3,898,419
[45] Aug. 5, 1975

[54] WELDING APPARATUS

[75] Inventor: Ralph E. Smith, Spring Lake, Mich.

[73] Assignee: Whiteman Manufacturing Company, Muskegon, Mich.

[22] Filed: Mar. 26, 1973

[21] Appl. No.: 345,238

[52] U.S. Cl. ................................. 219/130; 226/181
[51] Int. Cl. .............................................. B23k 9/12
[58] Field of Search ............ 219/74, 130, 131, 137, 219/136; 314/69, 72; 226/108, 111, 181, 184; 74/417, 15.2

[56] References Cited
UNITED STATES PATENTS

| | | | |
|---|---|---|---|
| 2,719,245 | 9/1955 | Anderson | 219/130 |
| 2,790,925 | 4/1957 | Landis et al. | 219/130 |
| 3,387,759 | 6/1968 | Stedman | 226/108 |
| 3,529,127 | 9/1970 | Smith | 219/131 F |

*Primary Examiner*—J. V. Truhe
*Assistant Examiner*—Clifford C. Shaw
*Attorney, Agent, or Firm*—Price, Heneveld, Huizenga & Cooper

[57] ABSTRACT

In welding equipment of the type providing a push drive for feeding consumable welding wire from a supply reel on a welding unit to a remote interconnected welding gun, a power take-off drive is coupled to the wire pushing drive and coupled to a pull drive mechanism positioned in the welding gun to provide a simultaneous push-pull drive. The pull drive mechanism in the remote gun is designed and driven to provide a pulling speed at the gun which is significantly greater than the pushing speed at the unit to compensate for motion of the welding gun by the operator during use of the equipment.

4 Claims, 11 Drawing Figures

PATENTED AUG 5 1975  3,898,419

SHEET 1

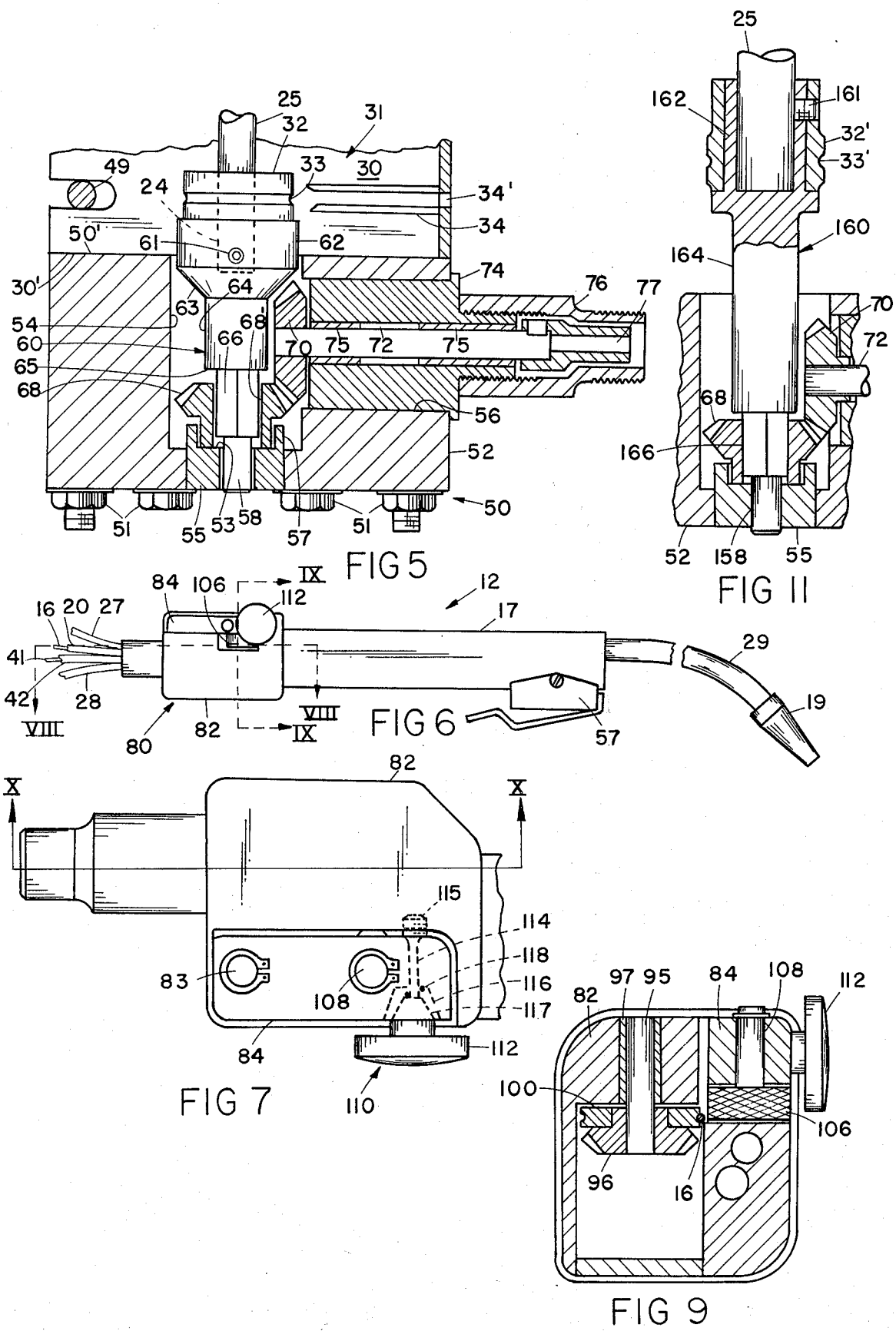

WELDING APPARATUS

BACKGROUND OF THE INVENTION

The present invention relates to consumable wire electrode welding apparatus and particularly to push-pull wire feed mechanism therefor.

In welding apparatus where a consumable wire electrode is fed from a supply reel on a welding unit to a remotely coupled welding gun held by an operator, feeding the wire can become very difficult, especially when using small diameter wires (which can be as small as .030 inches in diameter) or when using relatively small diameter aluminum electrode wire which is very brittle and difficult to feed.

When using larger diameter wire, a push feed at the welding unit generally performs satisfactorily to supply the remote welding gun with a constant feed rate of the consumable wire. When, however, relatively thin wire is employed, the wire tends to bunch up in the sheath extending from the welding unit to the gun and which provides a guide path for the wire.

To attempt to solve this problem, a pulling mechanism positioned in the gun has been provided. U.S. Pat. Nos. 3,293,477 issued on Dec. 20, 1966 to R. R. Lobosco and U.S. Pat. No. 3,529,127 issued on Sept. 15, 1970 to D. K. Smith represent welding apparatus employing a pulling drive mechanism in the welding gun for pulling relatively thin wire where pushing the wire from the welding head cannot be used. In the Smith patent, a push drive is employed for relatively large diameter wire, and a pull drive is used exclusively with smaller diameter once the wire has initially been pushed into the welding gun. The Lobosco patent describes a simultaneous pushing and pulling arrangement whereby the pushing drive is employed to even out the feed of the wire due to the poor load speed characteristics of the pulling drive. The patent emphasizes the need for identical drive speeds of the push and pull drive mechanism so that wire is neither stretched between the opposite ends of the apparatus nor bunched between the ends if the drive speeds are unequal.

Although the pull drive systems have proven at least partially successful in supplying relatively thin consumable welding wire to a remote welding gun, it has been discovered that when the operator moves the welding gun is an arc or rotates the welding gun during welding of a work piece, the rotating drive cable, typically used for coupling the pulling drive mechanism in the gun to a drive motor in the welding unit, adds to or subtracts from the drive speed of the wire pulling mechanism thereby undesirably increasing or decreasing the wire feed speed from the welding gun. When the push and pull drive speeds are identical, therefore, a reduction of the pulling speed due to movement of the welding gun tends to cause what is known in the trade as "bird nesting" namely, the bunching up of welding wire in the sheath between the gun and the welding unit. When this occurs, it is necessary for the operator to stop the welding process and either call a repairman to remove the bunched up wire and refeed the wire to the welding head or attempt to do it himself. Either way, the welding is temporarily out of operation thereby tremendously reducing the efficiency of the manufacturing process.

It is apparent, therefore, that improved means are required for feeding consumable welding wire from a welding head to a welding gun and particularly when relatively small diameter or brittle welding wire is employed.

SUMMARY OF THE INVENTION

The method and apparatus of the present invention solves the existing need for a wire feed system for gun welding apparatus and provides a positive and reliable push-pull drive system whereby the pulling speed is significantly greater than the pushing speed. By selecting the pulling speed significantly greater than the pushing speed and adjusting the pulling drive mechanism to permit slippage if necessary, the system of the present invention provides a uniform wire feed rate at the welding gun as the operator rotates or otherwise moves the welding gun around the work piece.

In the case where the motion of the welding gun reduces the drive speed of the pulling drive in the gun, the push and pull drive speeds will be approximately equal and the wire feed will be unaffected. When the operator moves the welding gun in a direction to increase the speed of operation of the pulling drive mechanism, a slight amount of slippage is permitted at the gun end to maintain the wire feed speed substantially constant.

Thus, it is seen that by providing a pulling speed significantly greater than the wire pushing speed, the apparatus of the present invention virtually eliminates the problem of bird nesting of the welding wire.

In addition, the apparatus of the present invention provides a power take-off unit which is readily coupled to the wire feeding means of a variety of welding units currently available on the market and, therefore, permits the adaptation of such units to the improved push-pull system of the present invention.

It is an object, therefore, of the present invention to provide an improved wire feeding mechanism for welding apparatus.

An additional object of the present invention is to provide an improved push-pull wire feeding mechanism in which the pulling drive speed is significantly greater than the pushing drive speed to accommodate movement of the welding gun during use by an operator.

A further object of the present invention is to provide apparatus for converting existing conventional push or push-pull welding units to the improved system to the present invention.

Still a further object of the present invention is to provide an improved method for feeding a consumable wire electrode from a welding unit to a remote welding gun.

These and other objects of the present invention will become apparent upon reading the following description thereof together with accompanying drawings in which:

BRIEF DESCRIPTION OF THE DRAWINGS

FIG. 5 is a plan view partly in cross section and partly broken away of the wire feed and power take-off units shown in FIG. 4;

FIG. 6 is a front elevation, partly broken away of the welding gun employed with the welding unit shown in FIGS. 1–5;

FIG. 7 is an enlarged plan view partly broken away of the pull drive housing portion of the gun shown in FIG. 6;

FIG. 9 is a cross-sectional view of the pull drive mechanism taken along the section lines IX—IX of FIG. 6;

FIG. 11 is a fragmentary, enlarged view partly in cross section, of an alternative power take-off shaft adaptable to be used with the power take-off unit shown in FIG. 5.

DETAILED DESCRIPTION OF THE PREFERRED EMBODIMENT

Figure 1:
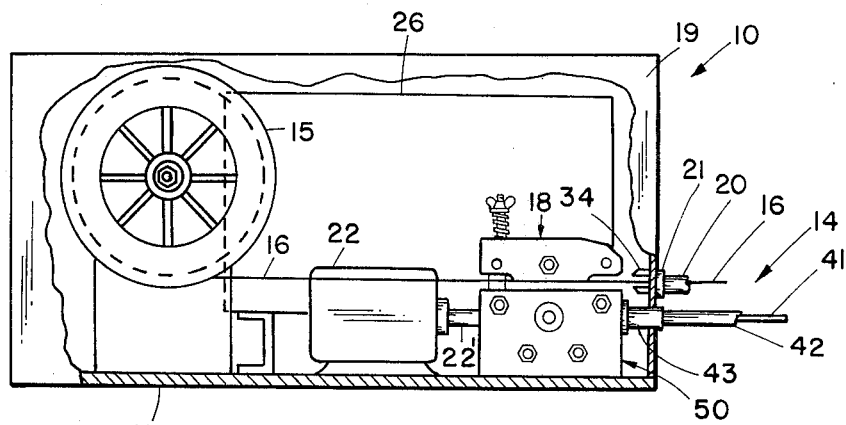
FIG. 1 is a front elevational view partly broken away of a welding unit embodying the present invention.

Referring briefly to FIGS. 1 and 6, it is seen that the preferred embodiment of the present invention is employed with a welding unit 10 which is interconnected to a welding gun 12 by interconnection means 14 shown in fragmentary form in FIGS. 1 and 6. The welding apparatus is of the metallic inert gas (MIG) type in which the welding unit supplies a consumable wire electrode 16 to the welding gun 12 as well as electrical power therefor and an inert gas for developing a shield around the welding area. Welding apparatus of this general type are well known and have been commercially available for several years.

In such apparatus, it is desired to provide a relatively lengthy (i.e., up to 25 feet or more) interconnecting cable to facilitate the use of the welding gun for reaching around a work piece without requiring the movement of the somewhat bulky welding unit 10. As discussed earlier, when providing relatively long interconnecting means, and when using thin welding wire, existing welding apparatus have not performed adequately to provide a uniform wire feed to the work piece which is necessary to provide good quality welds. Generally, the drive system for feeding the consumable wire 16 to the gun 12 has in the past employed a pushing drive unit which is located at the welding unit end of the system for forcing the wire downwardly through a protective sheath to a welding gun. In addition, recently developed units have employed a pulling drive assembly positioned in the welding gun for pulling wire of a relatively small diameter where it is impossible to push such wire at the welding unit end. Some attempts have even been made to simultaneously push and pull the wire at opposite ends of the interconnecting means although more frequently, the pushing and pulling drive mechanisms are operated independently depending upon the wire size.

These known feed systems for units of the general type shown in FIGS. 1 and 6 have been relatively unsuccessful in providing a uniform feed rate especially for thin welding wire due largely in part to the unrecognized problem that the rotation of the welding gun by the operator during its use as well as its overall movement, tends to add to or subtract from the rotary drive speed supplied by the rotary drive shaft typically connecting the pulling drive mechanism in the welding head with the drive in the welding unit. As will become apparent hereinafter, the improved apparatus as shown and described herein virtually eliminates the effects of such movements of the welding gun and will provide a simultaneous push-pull wire feed system whereupon the unit will provide a uniform feed rate for all wire including relatively thin wire having a diameter as small as .030 inches.

Figure 2:
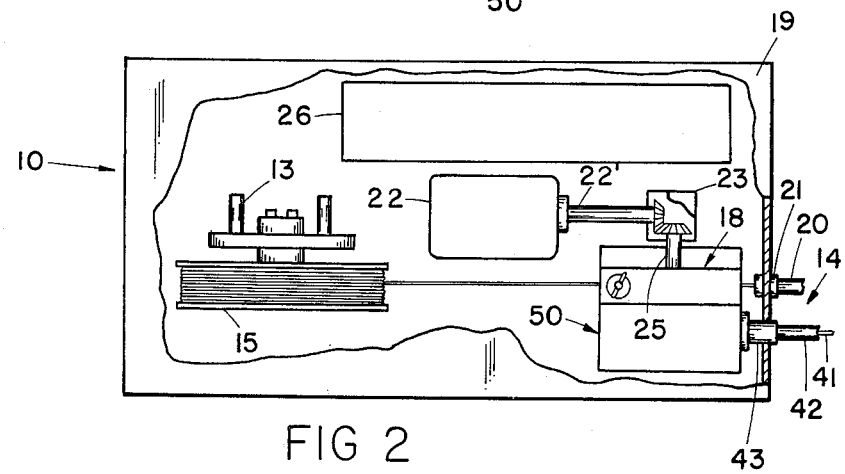
FIG. 2 is a partly broken away plan view of the welding unit shown in FIG. 1.

Referring now more specifically to the welding unit shown in FIGS. 1–5, and particularly to FIGS. 1 and 2, the welding unit 10 includes a base 11 to which is mounted a reel support frame 13 (FIG. 2) which extends upwardly from the base and rotatably supports a reel 15 on which the consumable wire electrode 16 is wound. The wire is threaded through a wire feed means 18 for pushing the wire from the welding unit 10 to the welding gun 12 via an interconnecting guide and sheath 20. The sheath 20 has a connector 21 attached to the wall of a cover 19 on the welding unit and is similarly coupled to the welding gun 12 such that it can be removed. The wire drive means 18 is powered by means of a wire feed motor 22 having a shaft 22′ coupled to a gear box 23 which in turn has a drive shaft 25 extending into the wire feed means 18.

According to one aspect of the present invention, a power take-off unit 50 is positioned adjacent to and mechanically coupled to the wire drive means 18, as described in detail below, to provide a rotating output drive employed to provide motive power for the pulling drive apparatus in the welding gun. A flexible shaft drive cable 41 is provided with a sheath 42 and connector 43 coupling one end of the cable to the power take-off unit 50. A similar connector is provided at the opposite end for coupling the flexible drive cable to welding gun 12.

The welding unit additionally includes a power supply and control unit 26 which applies, in a conventional manner, electrical operating power to the welding wire 16 and means for actuating the drive motor 22 which is interconnected with the control circuit 26 via a control cable 27 (FIG. 6) such that the push-pull drive mechanism can be controlled by a trigger on the welding gun coupled to the welding unit via cable 27 forming part of the interconnecting means between the welding unit and the welding gun. In addition, the welding apparatus includes a gas hose 28 (FIG. 6) interconnecting the welding unit to the gun for supplying an inert gas such as carbon dioxide, argon, or other conventionally employed gases used with MIG gun welding systems.

Figure 4:
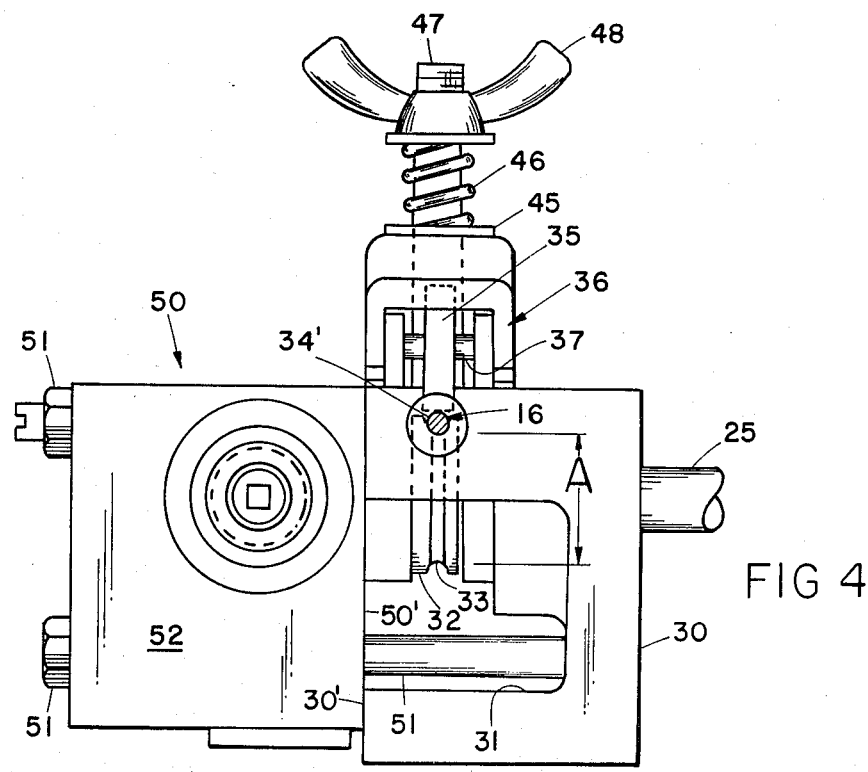
FIG. 4 is a right side elevation partly broken away of the wire feed and power take-off units shown in FIGS. 1-3.
Figure 3:
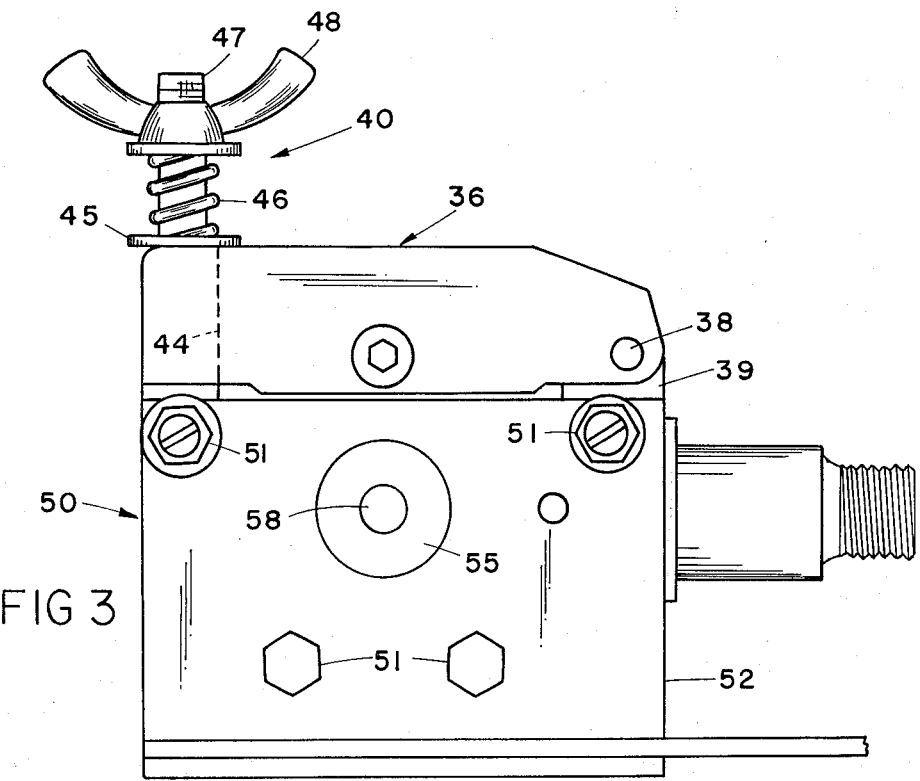
FIG. 3 is an enlarged, detailed front elevational view of the power take-off and wire feed units shown in FIGS. 1 and 2.

Referring now to the wire drive means 18 and the "piggyback" power take-off unit 50 in greater detail, reference is had to FIGS. 3–5 which illustrate the construction details of these units. As best seen in FIGS. 4 and 5, the drive shaft 25 rotatably coupled to wire feed motor 22 extends (via suitable bearings not shown) into a housing 30 which is fixedly mounted to base 11 of the welding unit. Housing 30 includes a generally rectangular channel 31 formed longitudinally therethrough and extending from left to right as seen in FIG. 5. A drive roller 32 is mounted within the channel 31 and is fixedly mounted to the shaft 25 which extends across channel 31. Roller 32 includes a semi-circular recess 33 extending around its outer periphery and serves as guide and support means for the consumable wire electrode 16 which seats therein once it is threaded through the drive means 18. The effective diameter of the drive roller 32, therefore, is the dimension A shown in FIG. 4, which is the diameter of the power drive roller taken across the bottom of the recess. Channel 31 is suitably formed to permit clearance of the drive roller 32 without contacting the housing. The housing additionally includes a wire guide and aperture 34, 34' (FIGS. 1, 4 and 5) formed through the front wall and through which the consumable wire electrode is threaded. Aperture 34 extends longitudinally through the housing 30 and is positioned with respect to the position of drive roller 32 such that the wire 16 will rest within the recess of the drive roller.

Wire feed means 18 further includes a pinch roller 35 (FIG. 4) rotatably mounted within a pivot member 36 by means of an axle 37. Pivot member 36 in turn is pivotally coupled to the housing 30 by means of a pivot axle 38, as best seen in FIG. 3, extending through a support boss 39 formed as part of housing 30. Member 36 can be pivoted in an upward arc to an open position when treading the welding wire through the wire drive means 18. As seen in FIG. 4, member 36 has a generally U-shaped cross section to permit the pivot mounting to the housing as well as for receiving the pinch roller 35 supported on axle 37 in aligned relationship to recess 33 in drive roller 32. At the end of member 36 opposite pivot pin 38, there is provided a notch 44 (FIG. 3) permitting a clamping and locking member 40 of conventional design to be fitted thereover such that a collar 45 on the member 40 will hold the pivot member 36 in a closed position whereby the pinch roller 35 captures the wire 16 and holds the wire within the recess 33 of drive roller 32.

Member 40 includes a shaft 49 pivotally mounted to housing 30 at its lower end and includes a spring 46 and a threaded end 47 with a thumb nut 48 such that the counter pressure applied by the pinch roller 35 against the welding wire 16 can be adjusted to prevent slippage of the welding wire through the wire feed means. As best seen in FIG. 5, drive shaft 25 extends through the drive roller 32 and has a protruding end 24 which, in the embodiment shown in FIGS. 3–5, is conveniently available for mechanically coupling the power take-off unit 50 to the wire feed motor 22.

The power take-off unit 50, shown in detail in FIGS. 3–5, comprises a housing 52 having a central opening 54 extending therethrough, as shown in FIG. 5, and a second opening 56 extending transversely to opening 54. At the end of opening 54 there is provided a bushing 55 having a shaft receiving aperture 55' for receiving the circular end segment 58 of a shaft extension 60 coupled at its opposite end to the extending end 24 of shaft 25 by means of one or more lock screws 61.

Shaft extension 60 has a collar 62 which provides sufficient support means for coupling the extension over shaft 23 in providing the set screw coupling thereto, the collar being tapered at 63 and extending through a smaller diameter section 64 to a section 66 which has a square cross section for receiving thereon a bevel gear 68 with a square aperture 68'. The squared section 66 has a flat-to-flat dimension slightly less than the circular cross section of portion 64 of extension 60 to define a shoulder 65 limiting the motion of bevel gear 68 in one direction on shaft segment 66. Gear 68 thus is permitted to move between shoulder 65 and the inner edge 53 of bushing 55. Bushing 55 includes an annular flange 56 (FIG. 5) which aids in holding gear 68 during assembly. This mounting arrangement permits bevel gear 68 to take up play when coupling collar 62 to shaft 25 when housing 52 is attached to housing 30 of the wire feed means by means of bolts 51. Frequently, the interface between units 30 and 50 is an uneven surface and shaft extension 60 must be moved axially to assure alignment of the bevel gear 68 with a correspondingly mating bevel gear 70 fixedly mounted to the end of output shaft 72 the gear 68 is permitted to slide on shaft segment 66. Thus for example, if the face 30' (FIGS. 4 and 5) of housing 30 is not perfectly flat (and typically it is not), the mating face 50' of housing 52 can cause, when the housing are coupled to one another, dimension variations which could prevent a single design or universal power take-off unit from being mounted to the variety of wire feed means 18 on the market when the welder unit is adapted to operate in accordance with the present invention. The floating bevel gear arrangement, however, permits the power take-off unit 50 to adapt the existing wire feed drives, either as shown or by employing separate mounting brackets by providing approximately 1/16 to 3/32 inch play along the square portion 66 of shaft extension 60.

It is noted here that once the required position of bevel gear 68 in shaft segment 66 is established, it may be desirable or even necessary in some instances to supply a nylon or other low friction washer in the space between gear 68 and shoulder 65. In some mounting arrangements, the bevel gear 68 can be mounted on the opposite side of shaft 72. In such case, a bias spring is provided between the gear and the end of the housing adjacent the wire feed drive to bias gear 68 into position against the mating bevel gear. All of these embodiments, however, permit the bevel gear to slide (at least initially) on the shaft to compensate for the mounting of the power take-off unit to the wire feed drive.

Continuing with the description of the power take-off unit, a fitting 74 in housing aperture 56 includes bushings 75 for rotatably receiving shaft 72 and supporting the shaft orthogonally to shaft extension 60 to provide a power take-off output drive including a connector 76 adapted to receive the correspondingly configurated connectors 43 (FIG. 1) of the flexible drive cable 41. The end of shaft 72 includes a square coupling member 77 to accommodate the correspondingly shaped end of the flexible drive cable.

When converting a conventional welding unit to include the improved push-pull drive system embodying the present invention, a variety of connections to the existing drive shaft extending into the wire feed means can be employed. In some instances, the shaft of the wire feed will not extend through the drive roller 32 a sufficient distance to permit direct coupling to an end of the shaft. In such instances, the alternative embodiment of the shaft extension used in the power take-off unit such as shown in FIG. 11, can be employed.

The shaft extension 160, shown in FIG. 11, similar includes a squared shaft portion 166 and is supported in the power take-off housing in the same manner as that shown in FIG. 5. The coupling collar 162, however, is specifically shaped to replace the drive roller 32 and provide a sleeve forming its own drive roller 32' with a wire receiving recess 33' such that the shaft extension 160 can be coupled to the drive shaft 20 where the previously existing drive roller was coupled. Thus, the collar 162 is fitted with a sleeve of a suitable diameter and thickness to provide the desired push speed, as described below, and which is fitted to the collar 162 by means of one or more lock screws 161. Thus, the power take-off unit 50 can be adapted to be coupled to the wire drive feed of any existing welding unit whether or not the drive shaft for the wire feed drive extends beyond the drive roller.

Having described the wire drive feed and the unique power take-off unit which can be coupled thereto, a brief description of the welding gun, followed by the specific relationship of the drive elements associated therewith to provide the improved wire feeding system, is now presented.

The welding gun 12 includes a barrel section 17 forming a gripping member for the operator. A nozzle 19 is coupled to the barrel by means of a curved member 29. As noted earlier, a trigger 57, which is an electrical switch, is provided for controlling the drive motor 22 for feeding the wire as required during the welding operation. The gun and nozzle conventionally provide a plurality of passages for the consumable wire electrode and the gas employed. In addition, the gun includes a pulling drive means 80 including a housing 82 with a hinged access door 84 pivotally mounted to the housing by means of a pivot pin 83 (FIG. 7) to permit the door 84 to be swung open for initially feeding the welding wire 16 through the gun. The construction details of the push drive means 80 are best understood by referring to FIGS. 7-10.

Figure 8:
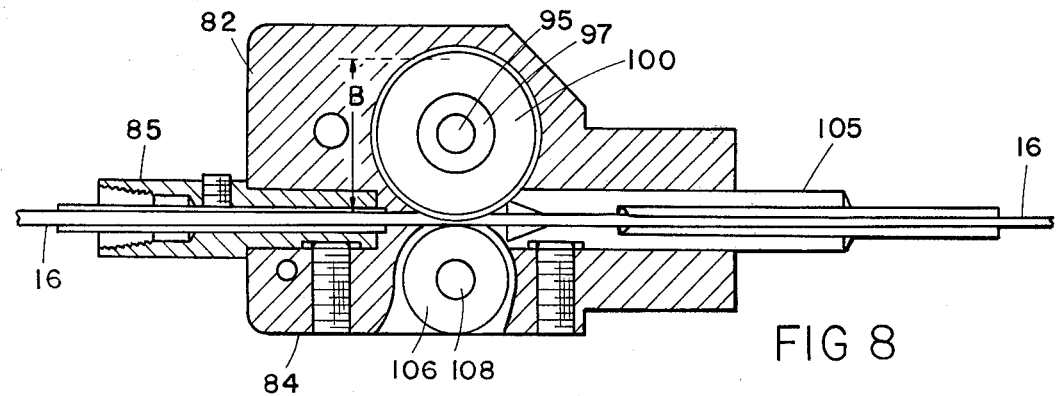
FIG. 8 is a fragmentary cross-sectional view of the pull drive mechanism taken along the section lines VIII—VIII of FIG. 6.
Figure 10:
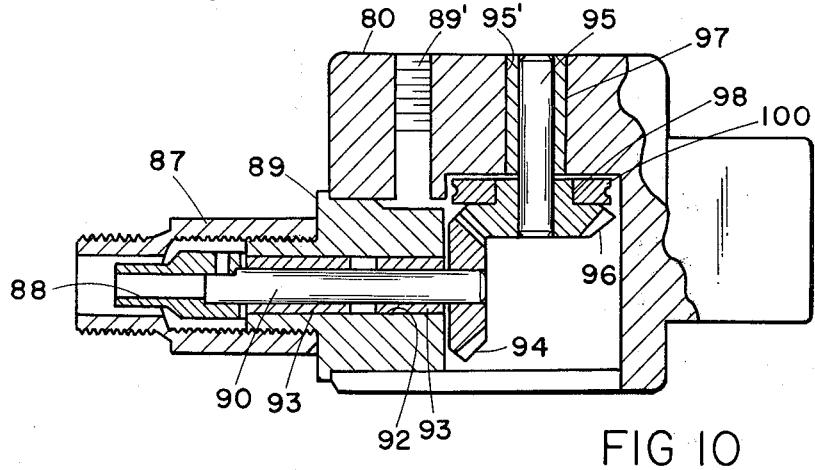
FIG. 10 is a cross-sectional view of the pull drive mechanism taken along the section lines X—X of FIG. 7.

As seen in FIG. 8, housing 82 includes a connector 85 for receiving the end of sheath 20 for welding wire 16 which includes a connector similar to connector 21 as shown in FIG. 1. In addition, the housing 84 includes a second connector 87 (FIG. 10) to which a connector, similar to connector 43 in FIG. 1, for the flexible drive cable 41 is attached such that the squared end of drive cable 41 can be fitted within a receiving fitting 88 having a similarly squared end. A drive shaft 90 is fitted within a fitting 89 secured within aperture 92 extending through housing 80 by set screw 89'. As seen in FIG. 10, shaft 90 is rotatably supported by means of bushings 93. Secured to the end of drive shaft 90 is a bevel gear 94 which engages a mating bevel gear 96 having a squared segment 98 to which there is attached a drive roller 100 of a configuration similar to roller 32 of the push drive mechanism.

Bevel gear 96 is mounted on a shaft 95 fitted within an aperture 95' in housing 80 in rotatable fashion by means of bushing 97. Suitable keeper clips are provided to maintain the shafts 90 and 95 in fixed relationship within the housing. Thus, it is seen that as the flex drive cable 41 is rotated by the power take-off unit 50, pull drive roller 100 is rotated in a manner described below to pull wire 16 into and through the gun. Conventional guide sleeves 105 (FIG. 8) facilitate the movement of the wire through the gun.

As best seen in FIGS. 8 and 9, door 84 includes a pinch roller 106 mounted on a shaft 108 rotatably fitted within the door and positioned in alignment with the drive roller 100 to provide a counter pressure against the welding wire 16 extending between rollers 100 and 106 as seen in FIGS. 8 and 10. A locking member 110 is provided for holding the door 84 in a closed position and for adjusting the pressure of pinch roller 106 against the drive roller 100 by means of a thumb screw 112 mounted on a shaft 114 extending through an aperture in the door and including a threaded end 115 threadably fitted within the housing 82. The door includes a recess 116 which permits the shaft receiving portion 117 of the thumb screw to be fitted therein. A spring 118 is provided between the end 117 and recess 116 to apply a counter pressure against knob 110.

In order to practice certain aspects of the present invention whereby the pulling speed is adjusted to be significantly greater than the pushing speed, first a gross speed compensation is provided to assure generally equal push and pulling drive speeds. This compensates for relatively large diameter differences between an existing push drive roller 32 and the pull drive roller 100 which is of necessity limited in diameter due to the size of housing 82 of the gun.

Gross speed compensation is provided by selecting the gear ratio between gears 68 and 70 in the welding unit or gears 94 and 96 in the gun by varying their diameters to provide approximately a 1:1 speed ratio between the push feed and the pulling feed. Thus for example, if the pushing roller diameter was 1.5 times that of the pulling roller diameter, the gear ratio would be 1:1.5 to provide generally equal pulling and pushing speeds for the consumable wire electrode.

Once the gear ratio has been selected for a particular installation, speed compensation is provided such that the pulling speed is significantly greater (i.e., approximately 2–10 percent) than the push drive speed. It is noted that it has been discovered that the range of 2–10 percent represents a workable range found to date. It is possible, however, that in some applications a pulling speed slightly different could be used. The second speed compensation is achieved by, after selecting substantially equal push and pull speeds through the gross compensation for a pull drive wheel of a given diameter, providing a slightly greater diameter pulling wheel 100. This diameter, which is dimension B shown in FIG. 8, is selected for a desired increased pulling speed. In one embodiment for example, where gross speed compensation yielded equal push and pull speeds for a 1 inch diameter pulling wheel, a pulling wheel diameter of 1.06 inches (dimension B, FIG. 8) was selected to provide an actual pulling speed 6 percent greater than the push drive speed.

As noted earlier, this significantly increased pulling speed compensates for the case where the movement of the gun substracts from the drive speed of pull roller 100 (by virtue of the rotating drive cable 41) so that the push and pull speeds will remain approximately equal under this condition. When the gun is moved or rotated in the opposite direction tending to increase the speed of the drive roller 100, the adjustment to thumb screw 112 allows some slippage between rollers 100 and 106 in the gun such that tension will not build up along the length of the wire between the welding unit and the gun sufficient to excessively stretch or break the wire.

It will become apparent to those skilled in the art that various modifications can be made to the preferred embodiment shown and described herein to achieve the desired results. For example, the gun pulling mechanism can be of a different type than the pull roller type employed. These and other modifications will, however, fall within the spirit and scope of the present invention as defined by the appended claims.

The embodiment of the invention in which an exclusive property or privilege is claimed are defined as follows:

1. Welding apparatus for feeding a consumable wire electrode from a welding unit to a remotely positioned welding gun comprising:

a welding unit including a supply of consumable wire electrode thereon;

a welding gun positioned remotely from said welding unit for feeding consumable welding electrode to a work piece on command;

guide means interconnecting said welding unit to said welding gun for providing a path along which said electrode can travel between said unit and said gun;

a housing including pushing drive means, said housing positioned on said welding unit for pushing said electrode along said guide means to said welding gun wherein said pushing drive means includes a drive shaft extending from said housing;

pulling drive means on said welding gun for pulling said welding wire through said guide means;

a power take-off unit positioned on said welding unit and coupled to said drive means thereon wherein said power take-off unit comprises a drive shaft extender coupled to said drive shaft and including a floating bevel gear thereon adapted to engage an additional bevel gear mounted on a power output shaft extending orthogonally to said shaft extender such that said power take-off unit can be positioned adjacent said housing on said welding unit and said floating bevel gear accommodates for interface surface variations between said power take-off unit and said housing of said push drive means; and drive cable means coupled to said power take-off unit and to said pulling drive means on said gun for actuating said pulling drive means to pull said wire electrode at said gun.

2. The apparatus as defined in claim 1 wherein said shaft extension includes an integral drive roller on said drive shaft for pushing said wire electrode when said shaft extension replaces a drive roller associated with said drive means on said welding unit.

3. The apparatus as defined in claim 1 wherein said shaft extender of said power take-off unit includes a segment with a rectangular cross section and said bevel gear includes a rectangular aperture larger than said cross section of said segment and is mounted on said segment to permit said bevel gear to slide along the longitudinal axis of said segment when said power take-off unit is coupled to said drive shaft of said pushing drive means.

4. The apparatus as defined in claim 3 wherein said pulling drive means pulls said wire electrode at a speed significantly greater than the pushing speed at said welding unit to compensate for motion of the welding gun during use.

* * * * *

UNITED STATES PATENT AND TRADEMARK OFFICE
CERTIFICATE OF CORRECTION

PATENT NO. : 3,898,419
DATED : August 5, 1975
INVENTOR(S) : Ralph E. Smith

It is certified that error appears in the above-identified patent and that said Letters Patent are hereby corrected as shown below:

Column 10, lines 11 and 12:

Omit "on said drive shaft".

Column 10, line 13:

After "drive roller" insert --- on said drive shaft ---.

Signed and Sealed this eighteenth Day of November 1975

[SEAL]

Attest:

RUTH C. MASON
Attesting Officer

C. MARSHALL DANN
Commissioner of Patents and Trademarks